(12) United States Patent
Baba et al.

(10) Patent No.: US 8,804,068 B2
(45) Date of Patent: Aug. 12, 2014

(54) LIQUID CRYSTAL DISPLAY DEVICE

(75) Inventors: Masashi Baba, Chiba (JP); Ikuko Imajo, Chiba (JP)

(73) Assignee: Panasonic Liquid Crystal Display Co., Ltd., Hyogo (JP)

( * ) Notice: Subject to any disclaimer, the term of this patent is extended or adjusted under 35 U.S.C. 154(b) by 32 days.

(21) Appl. No.: 13/356,175

(22) Filed: Jan. 23, 2012

(65) Prior Publication Data
US 2012/0188489 A1 Jul. 26, 2012

(30) Foreign Application Priority Data

Jan. 24, 2011 (JP) ................................. 2011-012384

(51) Int. Cl.
*G02F 1/1335* (2006.01)
(52) U.S. Cl.
USPC ................................. 349/62; 349/61; 349/64
(58) Field of Classification Search
USPC .......................................................... 349/62
See application file for complete search history.

(56) References Cited

U.S. PATENT DOCUMENTS

| 5,040,868 | A | * | 8/1991 | Waitl et al. ....................... 385/33 |
| 6,601,970 | B2 |   | 8/2003 | Ueda et al. |
| 2007/0247833 | A1 |   | 10/2007 | Lee et al. |
| 2011/0044053 | A1 | * | 2/2011 | Yamaguchi ............... 362/296.05 |
| 2012/0099046 | A1 | * | 4/2012 | Kasai .............................. 349/61 |
| 2012/0105764 | A1 | * | 5/2012 | Yokota ............................ 349/61 |
| 2012/0113328 | A1 | * | 5/2012 | Takeshima et al. ........... 348/739 |

FOREIGN PATENT DOCUMENTS

| JP | 2007-286627 |   | 11/2007 |
| WO | WO2011002078 | * | 1/2011 |

* cited by examiner

*Primary Examiner* — Edward Glick
*Assistant Examiner* — Alexander Gross
(74) *Attorney, Agent, or Firm* — Hamre, Schumann, Mueller & Larson, P.C.

(57) ABSTRACT

In order to fix lenses of light emitting diodes stably without impairing heat dissipation performance in a liquid crystal display device, the liquid crystal display device includes: a liquid crystal panel; and a light emitting diode substrate (7), which is disposed on a rear surface side of the liquid crystal panel and includes: a plurality of light emitting diode elements (22) disposed along a longitudinal direction; lenses (20) each including a plurality of legs (21), the lenses being disposed on the liquid crystal panel side of the light emitting diode elements (22); and electrodes (23) which are formed on a surface of the light emitting diode substrate (7) and are electrically connected to the light emitting diode elements (22), and all the legs (21) for fixing the lenses (20) to the light emitting diode substrate (7) are disposed directly above the electrodes (23).

10 Claims, 10 Drawing Sheets

PRIOR ART

FIG.10

PRIOR ART

FIG.11

PRIOR ART

LIQUID CRYSTAL DISPLAY DEVICE

CROSS-REFERENCE TO RELATED APPLICATION

The present application claims priority from Japanese application JP 2011-012384 filed on Jan. 24, 2011, the content of which is hereby incorporated by reference into this application.

BACKGROUND OF THE INVENTION

1. Field of the Invention

The present invention relates to a liquid crystal display device.

2. Description of the Related Art

JP 2007-286627 A discloses a liquid crystal display device including a direct type backlight unit. In the liquid crystal display device, a plurality of light emitting diodes are used as light sources of the backlight unit. The light emitting diodes are disposed in matrix across an entire region of the backlight unit.

In the liquid crystal display device described in JP 2007-286627 A, the light emitting diodes are disposed across the entire region of the backlight unit, and hence the size of a substrate on which a large number of light emitting diodes are disposed needs to be large enough to cover the entire region of the backlight unit. This increases cost for preparing a large number of light emitting diodes as well as a material cost of the substrate on which the light emitting diodes are to be disposed.

To address the problem, it is conceivable to dispose the light emitting diodes in a concentrated manner in a region where the backlight unit is positioned, for example, in the vicinity of the center of the backlight unit in the short side direction, along the long side direction of the backlight unit so that light beams emitted from the light emitting diodes are reflected and diffused by an appropriate reflection sheet so as to irradiate an entire image formation region.

In this type of liquid crystal display device, in order to diffuse light from the light emitting diode, a lens for diffusing light beams needs to be provided in front of a light emitting diode element. The lens needs to be disposed to be slightly elevated from the substrate on which the light emitting diode element is mounted so as not to be contact with the light emitting diode element. Thus, a plurality of legs, for example, three legs are provided at a peripheral edge portion of the lens.

On the other hand, the plurality of light emitting diodes that are disposed along a specific direction in a concentrated manner are arrayed in line, and hence electrodes are formed on the substrate so as to connect anodes and cathodes of the light emitting diodes in series (hereinafter, this substrate is referred to as light emitting diode substrate). The electrode is formed so as to have as large area as possible in order to efficiently dissipate heat generated by the light emitting diode element.

Figure 9:
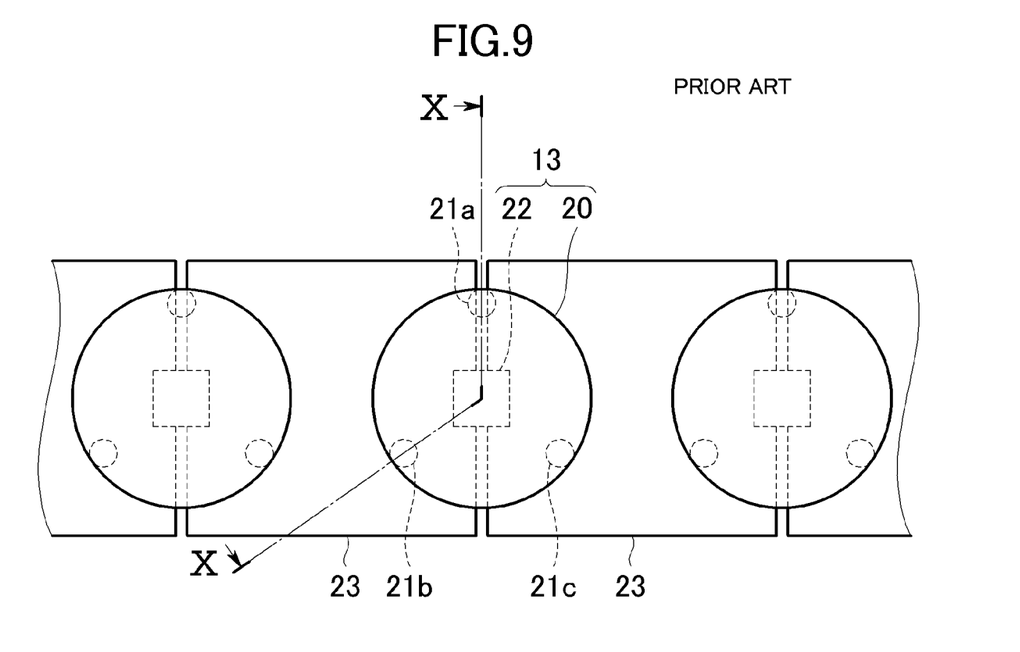
FIG. 9 is a plan view illustrating an enlarged part of a plurality of light emitting diodes arrayed on a light emitting diode substrate in line.

FIG. 9 is a plan view illustrating an enlarged part of a plurality of light emitting diodes 13 arrayed on the light emitting diode substrate in line. In FIG. 9, portions covered by lenses 20 are illustrated by broken lines.

As illustrated in FIG. 9, a light emitting diode element 22 is disposed on a boundary separating two electrodes 23 from each other, and the anode and the cathode of the light emitting diode element 22 are connected to different electrodes 23. The lens 20 has a circular planar shape, and is disposed above the light emitting diode element 22 so that the center thereof coincides with a light emission region of the light emitting diode element 22. Note that, herein, the light emitting diode element 22 and the lens 20 paired therewith are collectively referred to as light emitting diode 13.

The lens 20 is fixed at a position slightly elevated from the light emitting diode substrate by means of a plurality of legs 21a, 21b, and 21c provided at the peripheral edge thereof so as not to contact with the light emitting diode element 22. In the example of FIG. 9, the three legs 21a, 21b, and 21c are provided, each of which is disposed so as to constitute the vertex of an equilateral triangle. The legs 21a, 21b, and 21c are each fixed to the light emitting diode substrate by bonding.

Figure 10:
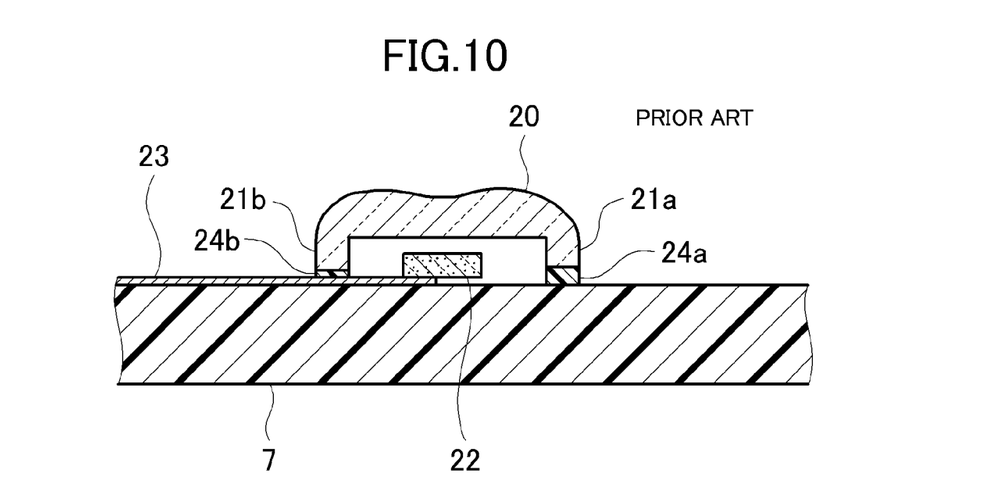
FIG. 10 is a partial cross-sectional view taken along the line X-X of FIG. 9.

FIG. 10 is a partial cross-sectional view taken along the line X-X of FIG. 9. As illustrated in FIG. 10, the leg 21b of the lens 20 is fixed to the electrode 23 through the intermediation of a bonding layer 24b, whereas the leg 21a is directly fixed to the surface of the light emitting diode substrate 7 through the intermediation of a bonding layer 24a. In this case, the electrode 23 is a copper foil with a thickness of about 35 to 70 μm, for example. Therefore, the thicknesses of the bonding layers 24a and 24b are different by the thickness of the electrode 23. Returning to FIG. 9, the same is also applied to the leg 21c, and hence, in this example, only the bonding layer 24a for fixing the leg 21a has a non-uniform thickness and has a partially thick portion.

If the thickness of the bonding layer varies among the legs, the bonding strength varies among the legs. Accordingly, there is a fear that the bonding layer may peel off due to vibration or thermal stress applied to the lens 20 or the lens 20 may be fixed at an angle at the time of bonding, thereby causing brightness unevenness on a screen of the liquid crystal display device. In particular, it is better to increase the thickness of the electrode 23 in order to efficiently dissipate heat generated from the light emitting diode 13. It is expected, however, that the increased thickness of the electrode 23 leads to more unstable fixation of the lens 20.

Figure 11:
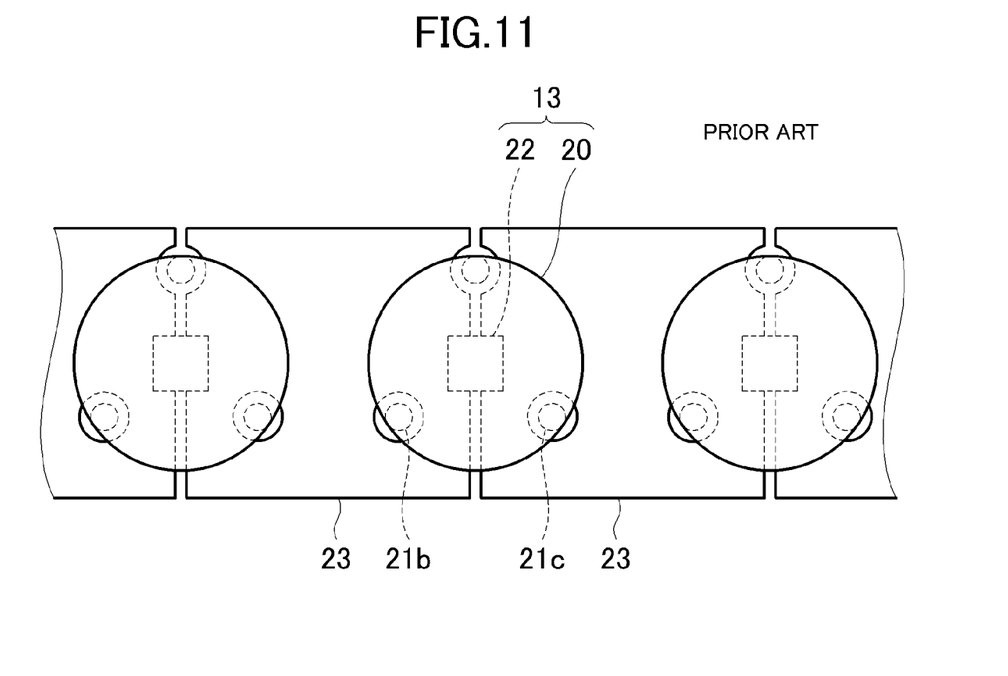
FIG. 11 is a plan view illustrating a configuration in which electrodes are cut out at portions of fixing legs of lenses so that the legs are directly fixed to the light emitting diode substrate.

As a possible countermeasure, as illustrated in FIG. 11, the electrode 23 is cut out at portions of fixing the legs 21a, 21b, and 21c of the lens 20 so that the legs 21a, 21b, and 21c are directly fixed to the light emitting diode substrate. This ensures that the lens 20 is fixed in a stable manner, but the area in which the electrode 23 is formed is reduced, thus impairing heat dissipation performance.

SUMMARY OF THE INVENTION

The present invention has been made in view of the above-mentioned circumstances, and has an object of fixing lenses of light emitting diodes stably without impairing heat dissipation performance in a liquid crystal display device including a backlight unit that irradiates an entire image formation region with light from the light emitting diodes that are disposed in a concentrated manner.

Representative aspects of the invention disclosed herein are briefly outlined as follows.

(1) A liquid crystal display device, including: a liquid crystal panel; and a light emitting diode substrate, which is disposed on a rear surface side of the liquid crystal panel and includes: a plurality of light emitting diode elements disposed along a longitudinal direction; lenses each including a plurality of legs, the lenses being disposed on the liquid crystal panel side of the plurality of light emitting diode elements; and electrodes which are formed on a surface of the light emitting diode substrate and are electrically connected to the plurality of light emitting diode elements, in which all the plurality of legs for fixing each of the lenses to the light emitting diode substrate are disposed directly above the electrodes.

(2) The liquid crystal display device as described in the above-mentioned item (1), in which: when a number of the plurality of legs for fixing the lens is odd, the plurality of legs are disposed asymmetrically about an extending direction of a gap separating the electrodes connected to one of the plurality of light emitting diode elements corresponding to the lens; and when the number of the plurality of legs for fixing the lens is even, the plurality of legs are disposed symmetrically about the extending direction of the gap without being disposed on the gap.

(3) The liquid crystal display device as described in the above-mentioned item (1), in which the electrodes include, at sides facing a gap separating the electrodes connected to one of the plurality of light emitting diode elements, a convex portion provided at a position corresponding to the leg, and a concave portion provided corresponding to the convex portion, respectively.

(4) The liquid crystal display device as described in any one of the above-mentioned items (1) to (3), in which arrangement of the plurality of legs in plan view is identical among all the lenses disposed on a single light emitting diode substrate.

(5) The liquid crystal display device as described in any one of the above-mentioned items (1) to (4), in which: each of the plurality of light emitting diode elements includes an anode and a cathode; and the light emitting diode substrate further includes an electrode for the anode and an electrode for the cathode, which are formed in a vicinity of the each of the plurality of light emitting diode elements.

(6) The liquid crystal display device as described in the above-mentioned item (5), in which: the electrode for the anode and the electrode for the cathode are formed directly under each of the lenses; and a boundary portion between the electrode for the anode and the electrode for the cathode is provided directly under the each of the lenses.

According to the above-mentioned invention disclosed herein, it is possible to fix the lenses of the light emitting diodes stably without impairing the heat dissipation performance in the liquid crystal display device including the backlight unit that irradiates the entire image formation region with light from the light emitting diodes that are disposed in a concentrated manner.

DETAILED DESCRIPTION OF THE INVENTION

Hereinafter, an exemplary embodiment of the present invention is described with reference to the accompanying drawings.

Figure 1:
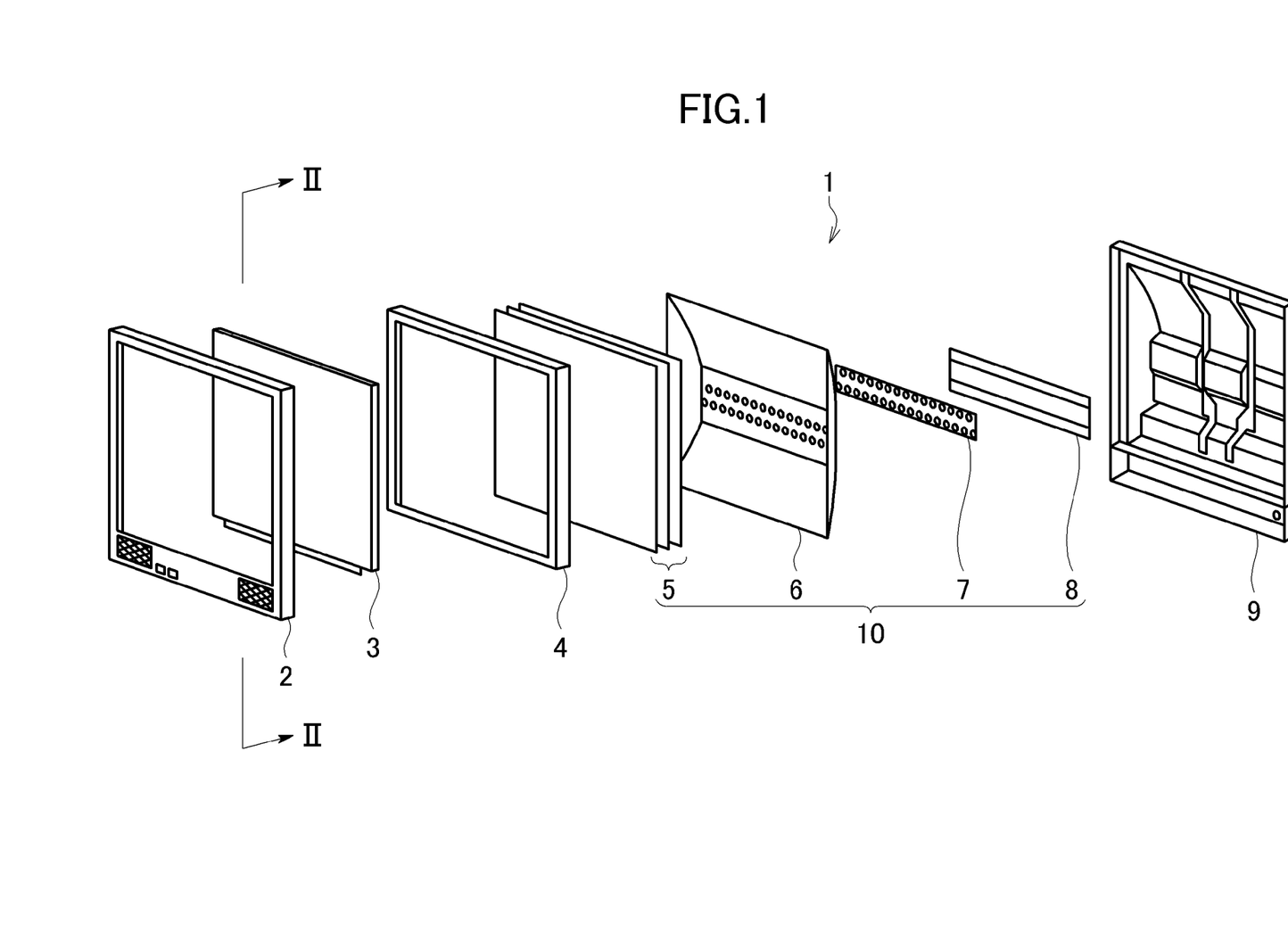
FIG. 1 is an exploded perspective view of a liquid crystal display device according to an exemplary embodiment of the present invention.

FIG. 1 is an exploded perspective view of a liquid crystal display device 1 according to this embodiment. As illustrated in FIG. 1, the liquid crystal display device 1 is assembled by arranging, in order from the front side, an upper frame 2, a liquid crystal panel 3, an intermediate frame 4, an optical sheet group 5, a reflection sheet 6, a light emitting diode substrate 7, a radiator plate 8, and a lower frame 9. Note that, the optical sheet group 5, the reflection sheet 6, the light emitting diode substrate 7, and the radiator plate 8 together constitute a backlight unit 10 that functions as a planar light source for illuminating the liquid crystal panel 3 from the rear surface side thereof. FIG. 1 illustrates only structural components of the liquid crystal display device 1 and omits other components, such as a control board and a speaker.

Figure 2:
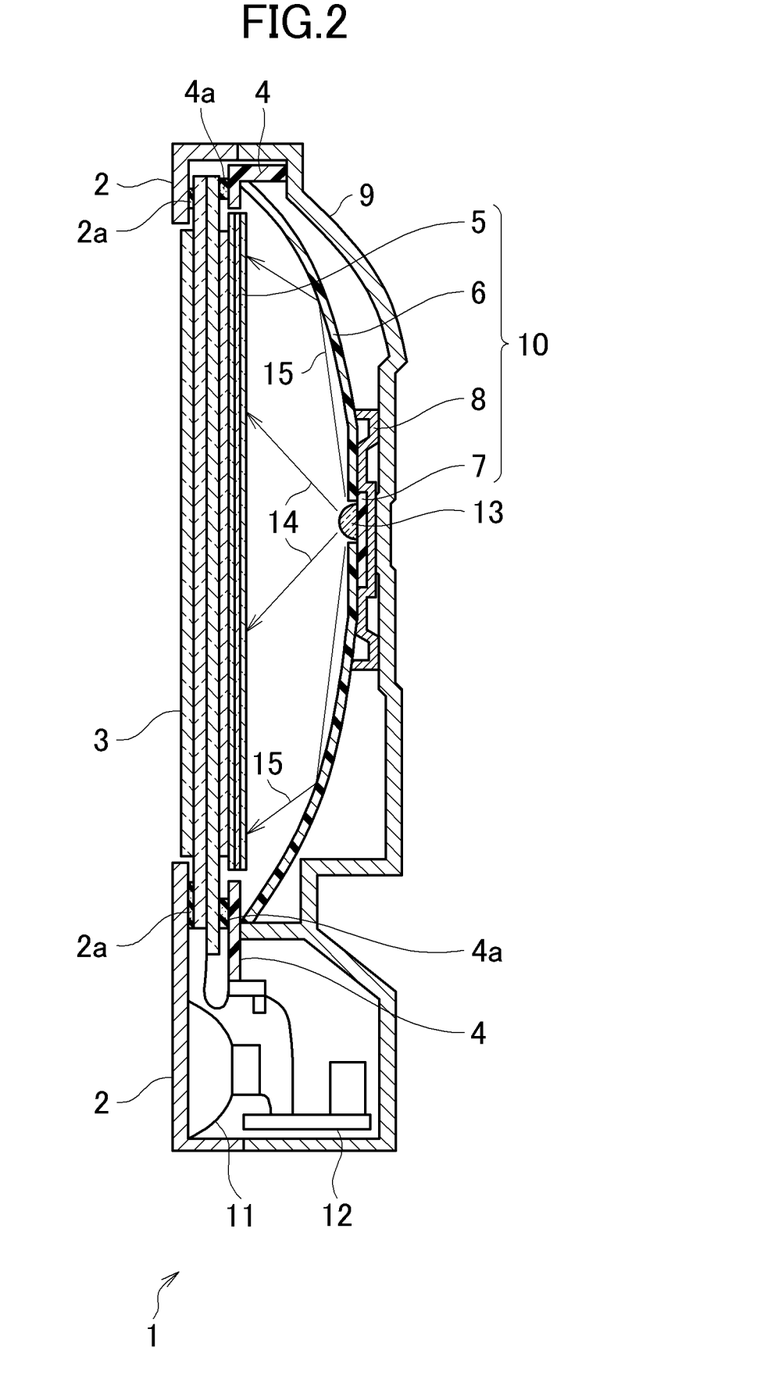
FIG. 2 is a schematic cross-sectional view of the liquid crystal display device taken along the line II-II of FIG. 1.

FIG. 2 is a schematic cross-sectional view of the liquid crystal display device 1 taken along the line II-II of FIG. 1. FIG. 2 illustrates a schematic cross-section of the assembled liquid crystal display device 1. As illustrated in FIG. 2, the liquid crystal display device 1 is structured to store the liquid crystal panel 3 and the backlight unit 10 in an outer frame formed of the upper frame 2 and the lower frame 9. The intermediate frame 4 is provided between the liquid crystal panel 3 and the backlight unit 10 so that the liquid crystal panel 3 and the backlight unit 10 are retained independently. The left side in FIG. 2 is the side where a user observes an image, which is hereinafter referred to as front side, and the surface facing the front side is referred to as front surface. The opposite side of the front side is referred to as rear surface side, and the surface facing the rear surface side is referred to as rear surface.

Note that, the liquid crystal display device 1 exemplified in this embodiment is a television set. Therefore, the liquid crystal display device 1 includes components for functioning as a television set, such as a speaker 11 illustrated in FIG. 2. Further, a control board 12 illustrated in FIG. 2 includes a power supply, a control circuit for the liquid crystal panel 3, and a control circuit for the backlight unit 10, as well as a circuit such as a tuner for receiving television broadcast. Note that, the liquid crystal display device 1 is not necessarily a television set, and may be a computer monitor, for example. In this case, the liquid crystal display device 1 may omit the components for functioning as a television set.

The upper frame 2 and the lower frame 9 constitute a housing for storing the liquid crystal panel 3 and the backlight unit 10, and it is preferred that the upper frame 2 and the lower frame 9 be formed of a lightweight material having high rigidity. Examples of the material that maybe used for the upper frame 2 and the lower frame 9 are metals, such as a steel plate, an aluminum alloy, and a magnesium alloy, FRP, and various kinds of synthetic resins. It is particularly preferred that the lower frame 9 be formed of a material having high heat conductivity in order to dissipate the heat generated due to light emission of the light emitting diodes efficiently, which is conducted from the light emitting diode substrate 7 via the radiator plate 8. In this embodiment, a steel plate is used. The material of the upper frame 2 may be the same as that of the lower frame 9 or may be different, and can be determined as appropriate considering the size, intended use, appearance, weight, and other factors of the liquid crystal display device 1. A buffer 2a is provided on the surface of the upper frame 2 facing the liquid crystal panel 3, so as to mitigate the shock occurring when the liquid crystal panel 3 swings due to vibration or the like and comes in contact with the upper frame 2. As the buffer 2a, an appropriate rubber, resin, sponge, or the like is used. It is to be understood that the support and buffer structure of the liquid crystal panel 3 described herein is an example.

The intermediate frame 4 is a member that retains the liquid crystal panel 3 and the backlight unit 10 independently in a separate manner. On the front surface of the intermediate frame 4, a buffer 4a is provided so as to mitigate the shock occurring when the liquid crystal panel 3 swings and comes in contact with the intermediate frame 4. As the buffer 4a, an appropriate rubber, resin, sponge, or the like is used. Note that, the structure of the intermediate frame 4 described herein is an example. The intermediate frame 4 may employ any structure that appropriately supports the liquid crystal panel 3 and the backlight unit 10, and may be omitted as occasion demands.

The material of the intermediate frame 4 is not particularly limited, either, but it is preferred to use a synthetic resin in terms of moldability and cost. In this embodiment, polycarbonate is used in terms of strength, but the material is not always limited thereto. As in fiber reinforced plastic (FRP), a reinforcing material may be mixed into a synthetic resin. It is also preferred that the intermediate frame 4 have light blocking effect and therefore be in black or dark color. The coloring of the intermediate frame 4 may be attained by a black or dark color material itself or by coating the surface of the intermediate frame 4. In this embodiment, the intermediate frame 4 is obtained by molding polycarbonate that is colored in black or dark color.

The backlight unit 10 includes the optical sheet group 5, the reflection sheet 6, the light emitting diode substrate 7, and the radiator plate 8. The light emitting diode substrate 7 of this embodiment is an elongated substrate on which a plurality of light emitting diodes 13 are mounted in line, and is provided so that a longitudinal direction of the light emitting diode substrate 7 is aligned with a longitudinal direction of the liquid crystal display device 1. The light emitting diode substrate 7 is fixed to the radiator plate 8. The reflection sheet 6 is a member for reflecting light from the light emitting diodes 13 to irradiate the rear surface of the liquid crystal panel 3 with light uniformly. The reflection sheet 6 has a curved cross-section as illustrated in FIG. 2. With such shape, light beams from the light emitting diodes 13 enter the optical sheet group 5 directly as indicated by arrows 14 of FIG. 2 or enter the optical sheet group 5 after reflected by the reflection sheet 6 as indicated by arrows 15 of FIG. 2.

The reflection sheet 6 and the optical sheet group 5 each have the size corresponding to the liquid crystal panel 3. Therefore, the liquid crystal panel 3 is illuminated with light uniformly from the rear surface side thereof. Here, the light emitting diode 13 includes a light emitting diode element and a lens which is disposed on the front surface side of the light emitting diode element. The light emitting diode element of this embodiment is a so-called light emitting diode package in which a light emitting diode chip is sealed with a sealing resin, and is mounted onto the light emitting diode substrate 7. However, this is not a limitation, and as another example, a light emitting diode chip may be formed directly on the light emitting diode substrate 7. The lens is an optical component for diffusing light beams emitted from the light emitting diode 13 so as to obtain illumination with uniform brightness over a display region of the liquid crystal panel 3.

The reflection sheet 6 has the size corresponding to the liquid crystal panel 3 as described above, and has a curved shape to be recessed as viewed from the front surface side. The reflection sheet 6 is provided with holes at positions at which the light emitting diodes 13 are disposed, so as to expose the light emitting diodes 13 to the front surface side of the reflection sheet 6. The material of the reflection sheet 6 is not particularly limited, and a white reflection sheet using a PET resin or the like or a mirror finish reflection sheet may be used. In this embodiment, a white reflection sheet is used. The optical sheet group 5 is a plurality of optical films including a diffusion sheet for diffusing light entering from the light emitting diodes 13, a prism sheet for refracting light beams toward the front surface side, and the like.

The light emitting diode substrate 7 is an elongated substrate on which the plurality of light emitting diodes 13 are mounted. The plurality of light emitting diodes 13 are disposed along one direction, here, a direction parallel to the long sides of the liquid crystal display device 1. Note that, how to array the light emitting diodes 13 is not particularly limited, but in this embodiment, the light emitting diodes 13 are disposed in two rows in a staggered manner. The details are described later. As to the size of the light emitting diode substrate 7, the length in the longitudinal direction thereof is slightly shorter than the length of the liquid crystal panel 3 in a corresponding direction, specifically about 70% to 80% in this embodiment. The length in a width direction thereof (direction orthogonal to the longitudinal direction) is shorter than the length of the liquid crystal panel 3 in a corresponding direction, preferably half the length or less, and about 10% to 20% in this embodiment. Further, the material of the light emitting diode substrate 7 is not particularly limited as long as the material is an insulating material, and the light emitting diode substrate 7 may be formed of an insulating material such as glass epoxy, paper phenol, and paper epoxy or may be formed of a metal with insulating coating. Note that, hereinafter, the longitudinal direction of the light emitting diode substrate 7, namely the direction in which the light emitting diodes 13 are arrayed, is referred to as longitudinal direction, and the direction within a plane of the light emitting diode substrate 7 and orthogonal to the longitudinal direction is referred to as width direction. Further, the above-mentioned specific dimensions of the light emitting diode substrate 7 are an example, and may be changed as appropriate depending on design of the liquid crystal display device 1. In this embodiment, the longitudinal direction is the direction parallel to the long sides of the liquid crystal display device 1, but instead, a direction parallel to the short sides of the liquid crystal display device 1 may be the longitudinal direction.

The radiator plate 8 is a metal plate to which the light emitting diode substrate 7 is mounted and which retains the reflection sheet 6. The radiator plate 8 itself is fixed to the lower frame 9. It is preferred that the material of the radiator plate 8 be high in thermal conductivity, and various kinds of metal and alloy may be suitable for use. In this embodiment, aluminum is used. A molding method for the radiator plate 8 is not particularly limited, and any method such as pressing and cutting may be used. In this embodiment, the radiator plate 8 is obtained by an extrusion molding method.

Figure 3:
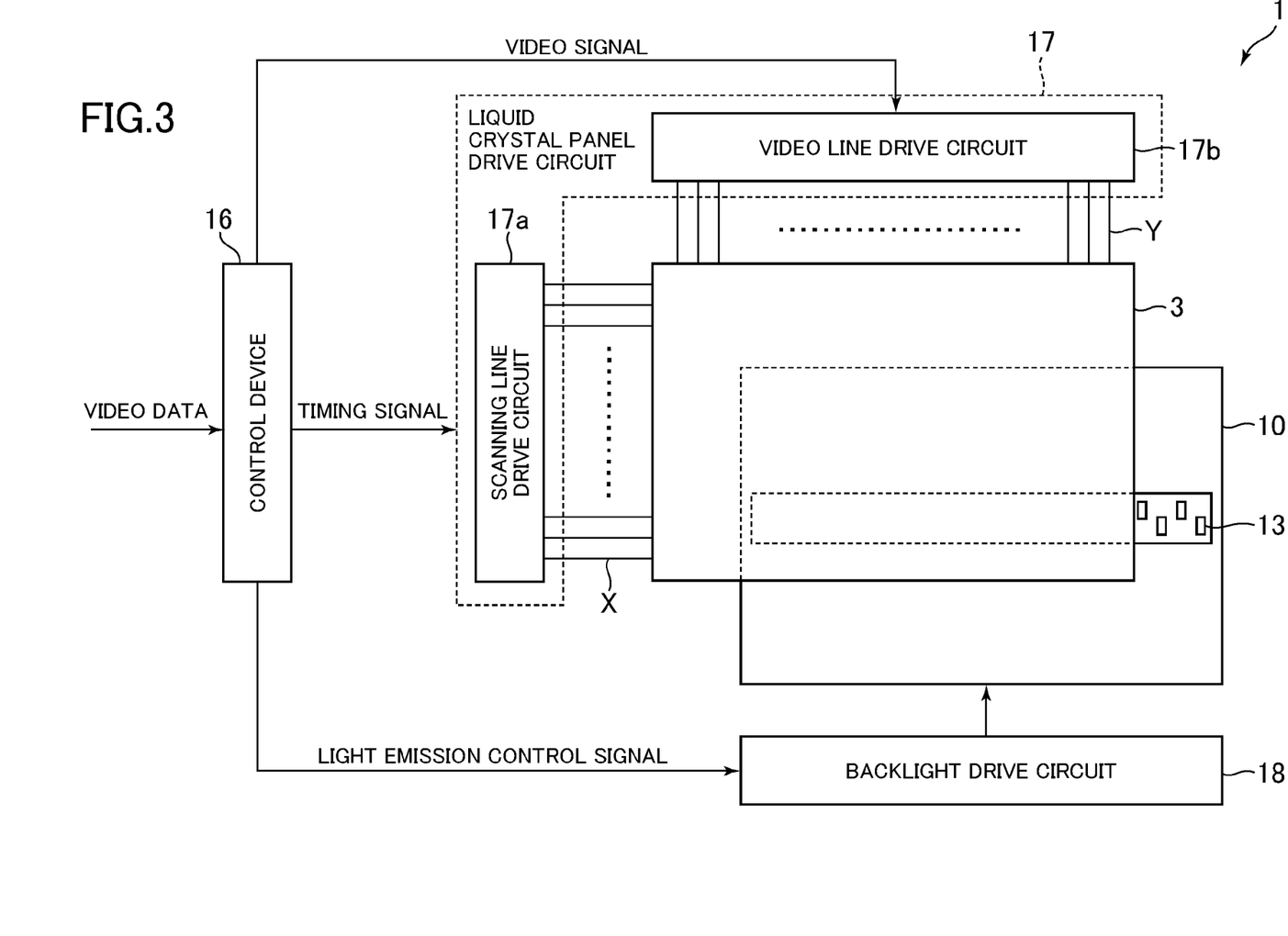
FIG. 3 is a diagram illustrating a configuration of the liquid crystal display device.

FIG. 3 is a configuration diagram illustrating a configuration of the liquid crystal display device 1. Referring to FIG. 3, functions of respective members of the liquid crystal display device 1 are described below.

The liquid crystal panel 3 has a rectangular shape, the lengths of which in the lateral direction and the vertical direction are determined depending on the intended use of the liquid crystal display device 1. The liquid crystal panel 3 may have a horizontally-elongated shape (the length in the lateral direction is longer than the length in the vertical direction) or a vertically-elongated shape (the length in the lateral direction is shorter than the length in the vertical direction). Alternatively, the lengths in the lateral direction and the vertical direction may be equal to each other. In this embodiment, the liquid crystal display device 1 is assumed to be used for a television set, and hence the liquid crystal panel 3 has a horizontally-elongated shape.

The liquid crystal panel 3 includes a pair of transparent substrates. On a TFT substrate as one of the transparent substrates, a plurality of video signal lines Y and a plurality of scanning signal lines X are formed. The video signal lines Y and the scanning signal lines X are provided orthogonal to each other to form a grid pattern. A region surrounded by adjacent two video signal lines Y and adjacent two scanning signal lines X corresponds to one pixel.

Figure 4:
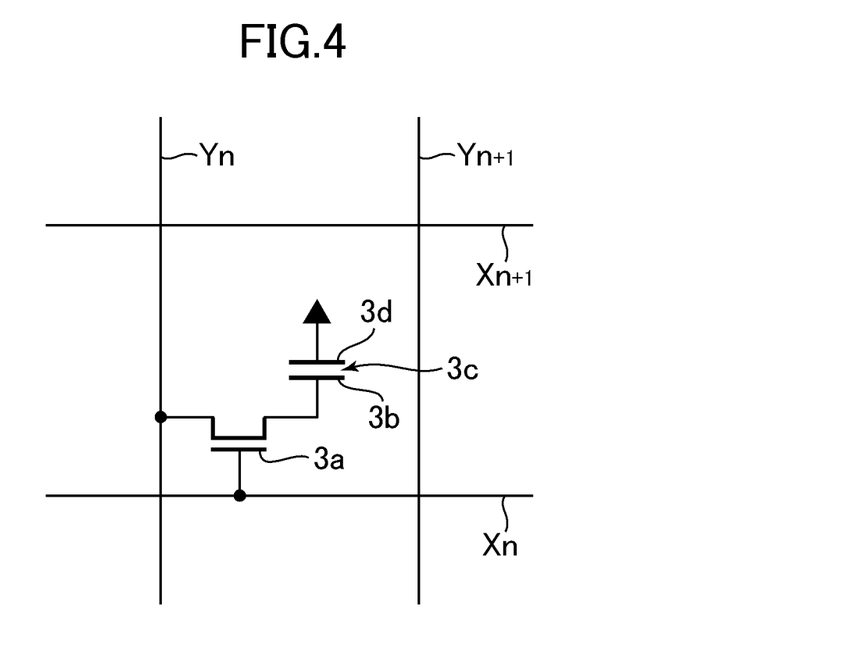
FIG. 4 illustrates a circuit diagram of one pixel formed in a liquid crystal panel.

FIG. 4 illustrates a circuit diagram of one pixel formed in the liquid crystal panel 3. In FIG. 4, a region surrounded by video signal lines Yn and Yn+1 and scanning signal lines Xn and Xn+1 corresponds to one pixel. The pixel focused here is driven by the video signal line Yn and the scanning signal line Xn. On the TFT substrate side of each of the pixels, a thin film transistor (TFT) 3a is provided. The TFT 3a is turned ON by a scanning signal input from the scanning signal line Xn. The video signal line Yn applies a voltage (signal representing a gradation value for each pixel) to a pixel electrode 3b of the pixel via the ON-state TFT 3a.

On the other hand, a color filter is formed on a color filter substrate as the other of the transparent substrates and a liquid crystal 3c is sealed between the TFT substrate and the color filter substrate. Then, a common electrode 3d is formed so as to form a capacitance with the pixel electrode 3b via the liquid crystal 3c. The common electrode 3d is electrically connected to a common potential. Accordingly, depending on the voltage applied to the pixel electrode 3b, an electric field between the pixel electrode 3b and the common electrode 3d changes, thereby changing the orientation state of the liquid crystal 3c to control the polarization state of light beams passing through the liquid crystal panel 3. Polarization filters are respectively adhered to a display surface of the liquid crystal panel 3 and a rear surface thereof, which is the opposite surface of the display surface. With this, each pixel formed in the liquid crystal panel 3 functions as an element that controls light transmittance. Then, the light transmittance of each pixel is controlled in accordance with input image data, to thereby form an image. Therefore, in the liquid crystal panel 3, a region in which the pixels are formed is an image formation region.

Note that, the common electrode 3d may be provided in either the TFT substrate or the color filter substrate. How to dispose the common electrode 3d depends on the liquid crystal driving mode. For example, in an in-plane switching (IPS) mode, the common electrode 3d is provided on the TFT substrate. In a vertical alignment (VA) mode or a twisted nematic (TN) mode, the common electrode is provided on the color filter substrate. This embodiment uses the IPS mode, where the common electrode 3d is provided on the TFT substrate. Further, the transparent substrates of this embodiment are formed of glass, but other materials such as a resin may be used.

Returning to FIG. 3, into a control device 16, video data received by a tuner or an antenna (not shown) or video data generated in a different device such as a video reproducing device is input. The control device 16 may be a microcomputer including a central processing unit (CPU) and a memory such as a read only memory (ROM) and a random access memory (RAM). The control device 16 performs various types of image processing, such as color adjustment, with respect to the input video data, and generates a video signal representing a gradation value for each of the pixels. The control device 16 outputs the generated video signal to a video line drive circuit 17b. Further, the control device 16 generates, based on the input video data, a timing signal for synchronizing the video line drive circuit 17b, a scanning line drive circuit 17a, and a backlight drive circuit 18, and outputs the generated timing signal to the respective drive circuits. Note that, this embodiment is not intended to limit the form of the control device 16 particularly. For example, the control device 16 may be constituted by a plurality of large scale integrations (LSIs) or a single LSI. Further, the control device 16 may not be configured to synchronize between the backlight drive circuit 18 and the other circuits.

The backlight drive circuit 18 is a circuit for supplying a current necessary for the plurality of light emitting diodes 13 which are light sources of the backlight unit 10. In this embodiment, the control device 16 generates a signal for controlling brightness of the light emitting diode 13 based on input video data, and outputs the generated signal toward the backlight drive circuit 18. Then, in accordance with the generated signal, the backlight drive circuit 18 controls an amount of current flowing through the light emitting diode 13 and adjust the brightness of the light emitting diode 13. The brightness of the light emitting diodes 13 may be adjusted for each of the light emitting diodes 13, or the plurality of light emitting diodes 13 may be divided into some groups and the brightness may be adjusted for each of the groups. Note that, as a method of controlling the brightness of the light emitting diode 13, a pulse width modulation (PWM) method may be employed, in which the brightness is controlled based on a light emission period with a constant current amount. As an alternative method, the current amount may be set constant so as to obtain light with constant light intensity, without controlling the brightness of the light emitting diode 13.

The scanning line drive circuit 17a is connected to the scanning signal lines X formed on the TFT substrate. The scanning line drive circuit 17a selects one of the scanning signal lines X in order in response to the timing signal input from the control device 16, and the selected scanning signal line X is applied with a voltage. When the voltage is applied to the scanning signal line X, the TFTs connected to the scanning signal line X are turned ON.

The video line drive circuit 17b is connected to the video signal lines Y formed on the TFT substrate. In conformity to the selection of the scanning signal line X by the scanning line drive circuit 17a, the video line drive circuit 17b applies, to each of the TFTs provided to the selected scanning signal line X, a voltage corresponding to the video signal representing the gradation value of each of the pixels.

Note that, in this embodiment, the control device 16 and the backlight drive circuit 18 illustrated in FIG. 3 are both formed on the control board 12 of FIG. 2. Further, a liquid crystal panel drive circuit 17 constituted by the scanning line drive circuit 17a and the video line drive circuit 17b is formed on flexible printed circuits (FPCs) electrically connected to the liquid crystal panel 3 (FIG. 3), or formed on a substrate constituting the liquid crystal panel 3 (so-called system-on-glass (SOG)). Note that, the arrangement described above is an example, and the respective circuits are provided at any portions.

Figure 5:
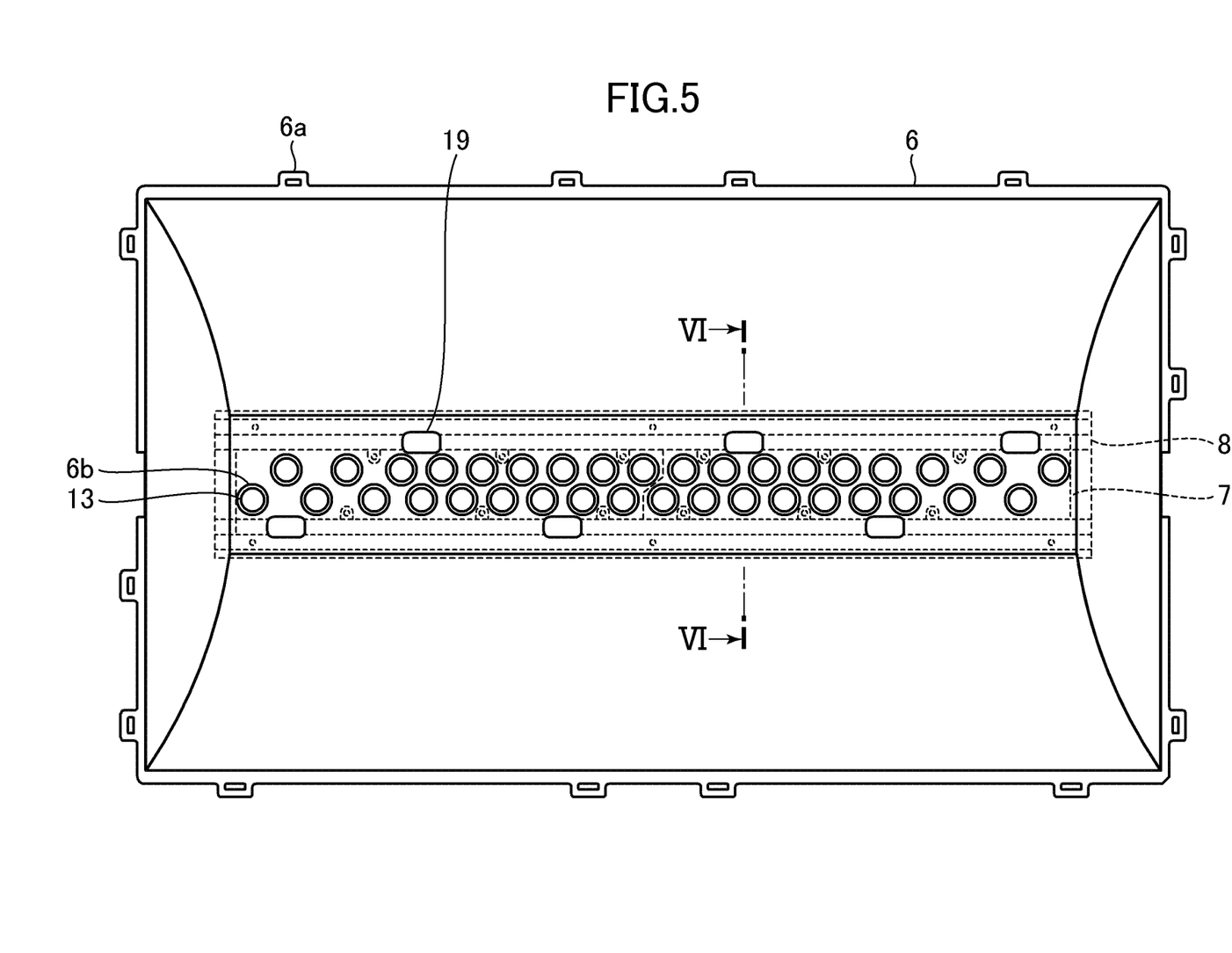
FIG. 5 is a view illustrating a reflection sheet, a light emitting diode substrate, and a radiator plate of the liquid crystal display device as viewed from the front surface side.

FIG. 5 is a view illustrating the reflection sheet 6, the light emitting diode substrate 7, and the radiator plate 8 of the liquid crystal display device 1 as viewed from the front surface side. Note that, in FIG. 5, portions of the light emitting diode substrate 7 and the radiator plate 8 which are hidden behind the reflection sheet 6 are illustrated by broken lines.

On the periphery of the reflection sheet 6, an appropriate number of fixing portions 6a protruding in a tongue shape are provided at appropriate intervals. The fixing portions 6a are used for fixing a peripheral portion of the reflection sheet 6, and in this embodiment, the fixing portions 6a are each provided with a hole for hooking therein a protrusion (not shown) provided to the intermediate frame 4 for fixation. However, the structure of fixing the peripheral portion of the reflection sheet 6 may be of any type.

Further, in a region of the center portion of the reflection sheet 6 in the width direction, holes 6b for exposing the light emitting diodes 13 to the front surface side of the reflection sheet 6 are provided corresponding to the array of the light emitting diodes 13. As illustrated in FIG. 5, the light emitting diodes 13 and the holes 6b are arrayed along the longitudinal direction. In this embodiment, the light emitting diodes 13 and the holes 6b are arrayed in two rows in the width direction, and the light emitting diodes 13 and the holes 6b belonging to different rows are arrayed in a staggered manner as illustrated in FIG. 5. Further, the array density of the light emitting diodes 13 is high around the center portion of the reflection sheet 6 in the longitudinal direction and low in the vicinity of both end portions thereof. That is, the interval between adjacent light emitting diodes 13 is larger in the peripheral portion of the image formation region than in the center portion of the image formation region. Note that, in FIG. 5, only representative one of the light emitting diodes 13 and only representative one of the holes 6b are denoted by symbols.

In this embodiment, the light emitting diode substrate 7 is divided into two at a position corresponding to the center of the image formation region, and two light emitting diode substrates 7 having the same shape are disposed at rotationally symmetric positions by one-eighty. This structure reduces the length per light emitting diode substrate 7, thus enabling the use of a compact apparatus for manufacturing the light emitting diode substrate 7 and a compact mounter for mounting the light emitting diode 13. However, dividing the light emitting diode substrate 7 is an option. The light emitting diode substrate 7 may be a single continuous substrate without being divided or may be divided into three or more substrates.

The light emitting diode substrate 7 is fixed onto the radiator plate 8, the length of which in the width direction is larger than that of the light emitting diode substrate 7. In the liquid crystal display device 1 according to this embodiment, the light emitting diodes 13 are disposed in a concentrated manner in the vicinity of the center of the liquid crystal display device 1 in the width direction. The entire image formation region is irradiated by the light emitting diodes 13 that are disposed in a concentrated manner, and hence light intensity of each light emitting diode 13 is large. Accordingly, the amount of generated heat per unit area in the region where the light emitting diodes 13 are disposed is increased. In order to dissipate the heat efficiently, the area of the radiator plate 8 having superior heat conductivity is increased to be larger than that of the light emitting diode substrate 7. The reflection sheet 6 is fixed to the radiator plate 8 by reflection sheet fixtures 19 in the vicinity of the center in the width direction.

Figure 6:
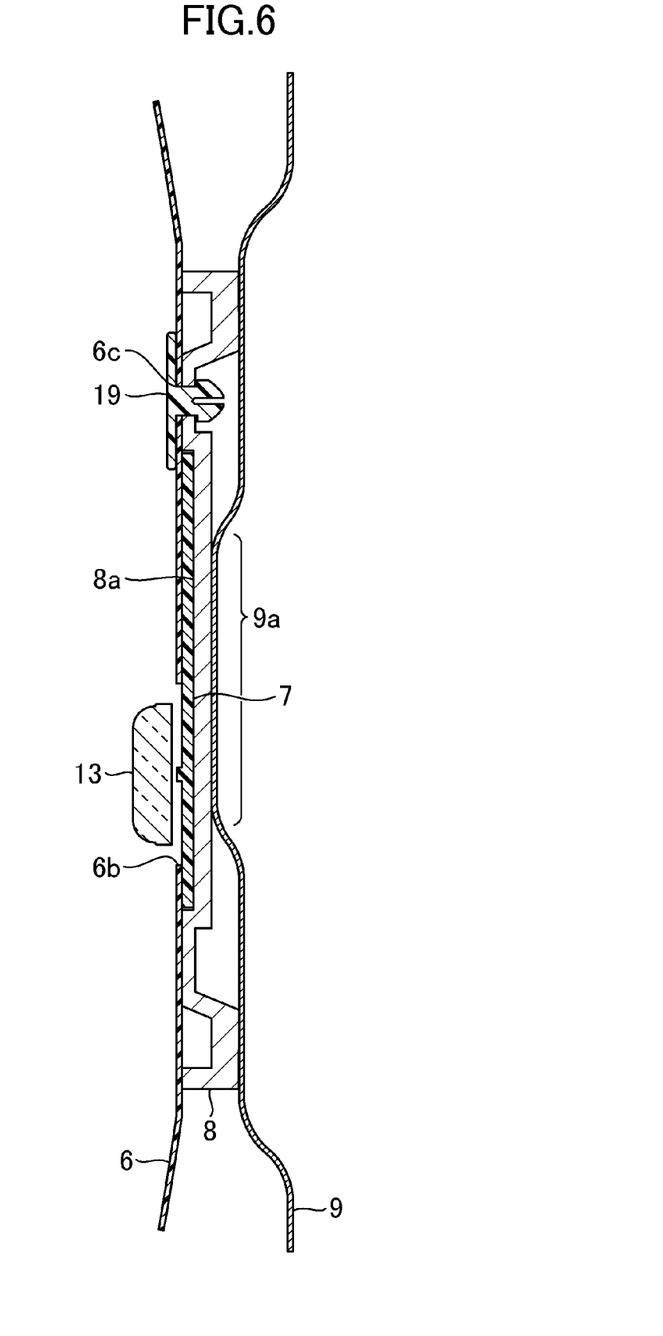
FIG. 6 is a partial enlarged cross-sectional view taken along the line VI-VI of FIG. 5.

FIG. 6 is a partial enlarged cross-sectional view taken along the line VI-VI of FIG. 5. In FIG. 6, the lower frame 9 is also illustrated. The left side in FIG. 6 is the front surface side, and the right side in FIG. 6 is the rear surface side.

The radiator plate 8 includes a light emitting diode substrate receiving portion 8a, which is a recess portion formed by steps provided to the front surface thereof. The light emitting diode substrate receiving portion 8a is a recess for receiving the light emitting diode substrate 7, the length of which in the width direction is substantially the same as or slightly larger than the length of the light emitting diode substrate 7 in the width direction. Further, the depth of the light emitting diode substrate receiving portion 8a, namely the height of the steps forming the light emitting diode substrate receiving portion 8a, is substantially equal to the thickness of the light emitting diode substrate 7, preferably within ±0.5 mm with respect to the thickness of the light emitting diode substrate 7. With this, the front surface of the light emitting diode substrate 7 is substantially flush with the front surface of the radiator plate 8 on the outer side of the light emitting diode substrate 7 in the width direction.

FIG. 6 also illustrates how the light emitting diode 13 mounted on the light emitting diode substrate 7 passes through the hole 6b provided in the reflection sheet 6 and is exposed to the front surface side of the reflection sheet 6. The reflection sheet 6 is further provided with a fixing hole 6c. With the reflection sheet fixture 19 passing through the fixing hole 6c, the reflection sheet 6 is fixed to the radiator plate 8 in a region on the outer side of the light emitting diode substrate 7 in the width direction. The size of the fixing hole 6c is slightly larger than the cross section of a passing portion of the reflection sheet fixture 19, in order to allow for a relative change in dimensions of the respective members caused by different linear expansion coefficients when the light emitting diode 13 generates heat to undergo thermal expansion. Further, the front surface of the light emitting diode substrate 7 and the front surface of the radiator plate 8 are substantially flush with each other, and hence, on the front surface side thereof, the reflection sheet 6 is retained flat without waving.

The reflection sheet fixture 19 may be of any type and is not particularly limited. In this embodiment, a fixing pin having a snap-in mechanism is used as illustrated in FIG. 6, which facilitates fixation of the reflection sheet 6. It is preferred that the material of the reflection sheet fixture 19 be the same as that of the reflection sheet 6 or be a similar white synthetic resin. This minimizes brightness unevenness at the position where the reflection sheet fixture 19 is disposed. Further, the height of a portion of the reflection sheet fixture 19 on the front surface side, namely a so-called head portion of the fixing pin, is set to be as small as possible so that the position of the front surface of the reflection sheet fixture 19 is located on the rear surface side with respect to the position of the front surface of the light emitting diode 13. This prevents a shaded region which is not irradiated with sufficient light from the light emitting diode 13 from being formed on the outer side of the reflection sheet fixture 19 in the width direction.

Further, in a region of the lower frame 9 corresponding to the light emitting diode substrate 7, a radiator plate contact portion 9a, which is a convex portion protruding toward the front surface side, is provided. The radiator plate contact portion 9a contacts the rear surface of the radiator plate 8, to thereby dissipate heat generated by the light emitting diodes 13 to the outside on the rear surface side of the lower frame 9 by heat transfer. In this embodiment, the heat is cooled by natural convection.

Figure 7:
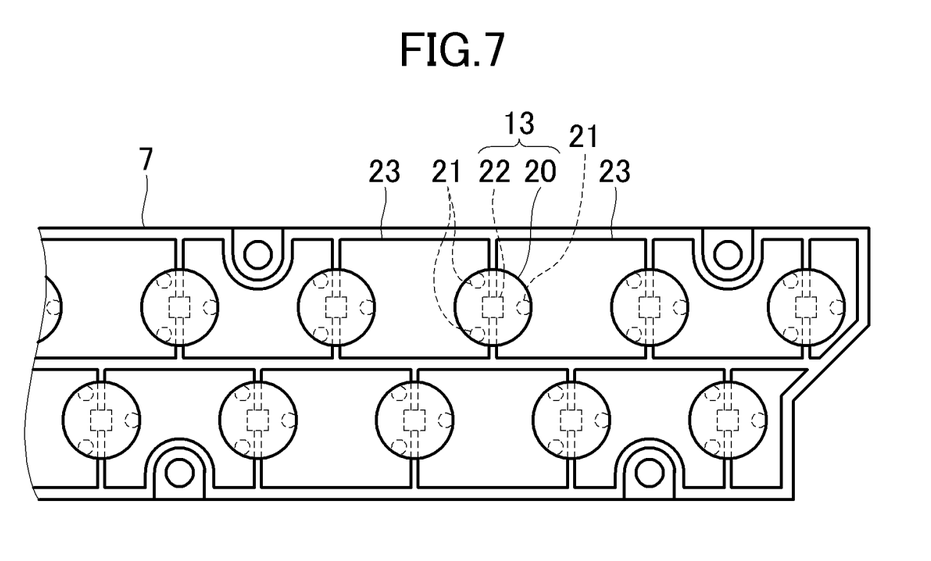
FIG. 7 is a partial enlarged view of the light emitting diode substrate.

FIG. 7 is a partial enlarged view of the light emitting diode substrate 7. The portion illustrated in FIG. 7 is a portion of one light emitting diode substrate 7 disposed on the left side of FIG. 5 out of the divided light emitting diode substrates 7, in a region close to the center of the liquid crystal display device 1. In FIG. 7, portions covered by lenses 20 are illustrated by broken lines. Further, to avoid complicating the drawing, only representative one of the light emitting diodes 13 is denoted by symbols.

As illustrated in FIG. 7, in this embodiment, all legs 21 for fixing the lens 20 are disposed directly above electrodes 23. The phrase "the leg 21 is disposed directly above the electrode 23" means that, when the leg 21 is projected onto the front surface of the light emitting diode substrate 7, all parts of the image are projected onto the front surface of the electrode 23. With this arrangement, the thicknesses of bonding layers for bonding the legs 21 and the light emitting diode substrate 7 are all uniform so that the lenses 20 are fixed in a stable manner. Besides, it is not necessary to cut out the electrode 23, and hence heat dissipation performance is not impaired. Note that, "the leg 21 for fixing the lens 20" refers to only a leg 21 that contributes to the fixation of the lens 20 through the intermediation of a bonding layer. That is, in the case where the lens 20 has a large number of, for example, four or more legs 21, if there is a leg 21 that is not fixed by bonding, the leg 21 concerned may be ignored and may be positioned anywhere. Further, it is not always necessary to fix the leg 21 directly to the electrode 23 through the intermediation of a bonding layer, and, for example, the leg 21 may be fixed through the intermediation of an additional insulating layer such as a resist layer formed on the front surface of the electrode 23.

Further, as illustrated in FIG. 7, the orientation of the lens 20, namely the arrangement of the legs 21 in plan view (as viewed from the front surface side), is identical among all the lenses 20 disposed on a single light emitting diode substrate 7. This eliminates the need to rotate the lenses 20 independently when the lenses 20 are mounted on a single light emitting diode substrate 7, thereby shortening manufacturing lead time and contributing to cut-down of unit manufacturing cost. The reason why the limitation to a single light emitting diode substrate 7 is placed is that, in the case where there are a plurality of divided light emitting diode substrates 7 as in this embodiment, each of the divided light emitting diode substrates 7 is often rotated at the time of assembling the liquid crystal display device 1. For example, in the case of this embodiment, the divided light emitting diode substrates 7 have a relationship where the substrates are horizontally rotated by 180 degrees as illustrated in FIG. 5. Therefore, the orientations of the lenses 20 also have a relationship where the orientations are rotated by 180 degrees on the respective horizontally-divided light emitting diode substrates 7.

In addition, there are various methods of disposing all the legs 21 for fixing the lens 20 directly above the electrodes 23. The methods are listed and described below. Note that, the following description assumes that the legs 21 are disposed at equal intervals along the circumference of the lens 20, that is, the legs 21 constitute the vertices of an equilateral polygon.

Figure 8A:
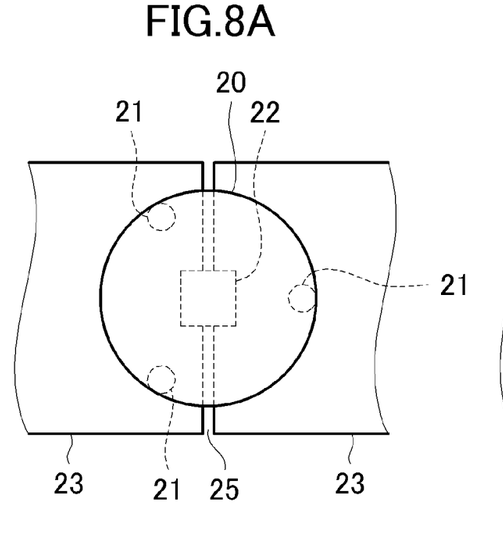
FIG. 8A is a view illustrating the case where the number of legs for fixing a lens is odd, specifically three.
Figure 8B:
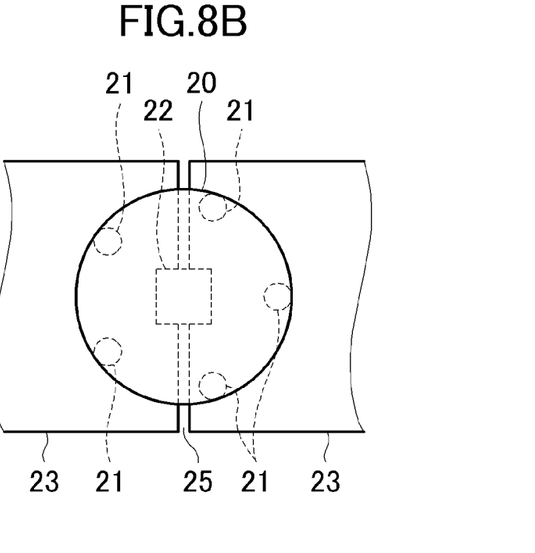
FIG. 8B is a view illustrating the case where the number of legs for fixing a lens is odd, specifically five.

FIGS. 8A and 8B are views each illustrating the case where the number of the legs 21 for fixing the lens 20 is odd. FIG. 8A illustrates the case where the number of the legs 21 for fixing the lens 20 is three, and FIG. 8B illustrates the case where the number of the legs 21 for fixing the lens 20 is five. In those cases, in a lens 20, the legs 21 for fixing the lens 20 are disposed asymmetrically about an extending direction of a gap 25 separating the electrodes 23 connected to an anode and a cathode of a light emitting diode element 22 corresponding to the lens 20 (in those examples, the extending direction is the vertical direction of FIGS. 8A and 8B, and coincides with the width direction).

Figure 8C:
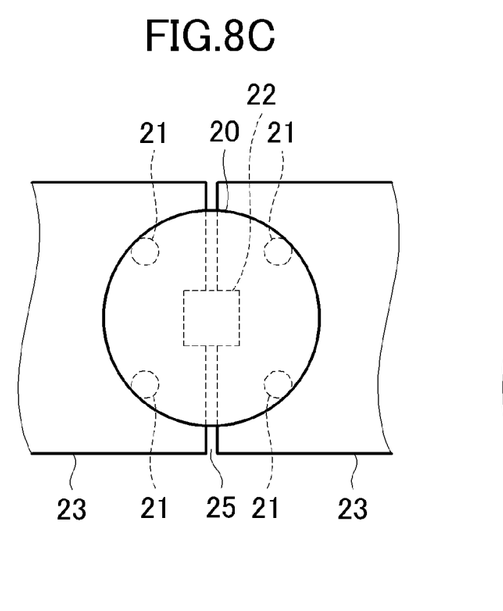
FIG. 8C is a view illustrating the case where the number of legs for fixing a lens is even, specifically four.

FIG. 8C is a view illustrating the case where the number of the legs 21 for fixing the lens 20 is even, specifically four. In the case where the number of the legs 21 is even, the respective legs 21 are disposed symmetrically about the extending direction of the gap 25 without being disposed on the gap 25.

Figure 8D:
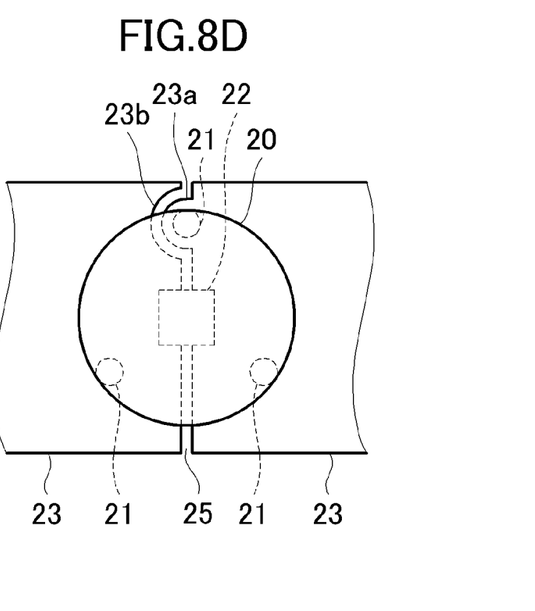
FIG. 8D is a view illustrating another example of the case where the number of legs for fixing a lens is odd, specifically three.

FIG. 8D is a view illustrating another example of the case where the number of the legs 21 for fixing the lens 20 is three. As illustrated in FIG. 8D, at the sides of the electrodes 23 facing the gap 25, a convex portion 23a is provided at the position corresponding to the leg 21, and a concave portion 23b is provided corresponding to the convex portion 23a, respectively. Also in this case, all the legs 21 for fixing the lens 20 can be disposed directly above the electrodes 23. It should be understood that this method may be used similarly also in the case where an arbitrary number of four or more legs 21 for fixing the lens 20 are provided.

Note that, the methods described above are an example of various methods of disposing all the legs 21 for fixing the lens 20 directly above the electrodes 23. Other arrangement may be employed as an option. Further, the legs 21 may not be disposed at equal intervals along the circumference of the lens 20, and the planar shape of the lens 20 is not always necessary to be circular.

Note that, the embodiment described above is a specific example for describing the present invention, and the present invention is not intended to be limited to the embodiment.

For example, in the embodiment, the liquid crystal display device 1 is structured to have only a single light emitting diode substrate 7 at the center of the liquid crystal display device 1 in the width direction, but may be structured to have two or more light emitting diode substrates 7 which are disposed side by side in the width direction thereof. Further, the plurality of light emitting diode elements 22 are not necessarily connected in series but may be connected in parallel. Still further, the number and arrangement of the light emitting diodes 13 and the number, shape, and arrangement of other members are not limited to the ones described in the embodiment, and an appropriate number, shape, and arrangement are intended to be optimized as necessary.

In other words, while there have been described what are at present considered to be certain embodiments of the invention, it will be understood that various modifications may be made thereto, and it is intended that the appended claims cover all such modifications as fall within the true spirit and scope of the invention.

What is claimed is:

1. A liquid crystal display device, comprising:
   a liquid crystal panel; and
   a light emitting diode substrate, which is disposed on a rear surface side of the liquid crystal panel and comprises:
      a plurality of light emitting diode elements disposed along a longitudinal direction;
      a plurality of lenses each including a plurality of legs, each of the lenses being disposed on the liquid crystal panel side of a respective one of the plurality of light emitting diode elements; and
      a plurality of electrodes, formed on a surface of the light emitting diode substrate with a gap defined between adjacent ones of the electrodes, and having a surface facing the liquid crystal display panel, wherein each of the plurality of light emitting diode elements is electrically connected to two adjacent ones of the plurality of electrodes and extends across the gap between the two adjacent electrodes, wherein each leg of the plurality of legs for fixing each of the lenses to the light emitting diode substrate is mounted directly to, and completely disposed directly above, only one of the adjacent two electrodes to which the light emitting diode element for the lens is connected, so that all parts of an image of the leg projected onto the light emitting diode substrate fall on the surface facing the liquid crystal panel of the electrode above which the leg is disposed.

2. The liquid crystal display device according to claim 1, wherein:

when a number of the plurality of legs for fixing the lens is odd, the plurality of legs are disposed asymmetrically about an extending direction of a gap separating the electrodes connected to one of the plurality of light emitting diode elements corresponding to the lens; and when the number of the plurality of legs for fixing the lens is even, the plurality of legs are disposed symmetrically about the extending direction of the gap without being disposed on the gap.

3. The liquid crystal display device according to claim 1, wherein the electrodes include, at sides facing the gap separating the electrodes connected to one of the plurality of light emitting diode elements, a convex portion provided at a position corresponding to the leg, and a concave portion provided corresponding to the convex portion, respectively.

4. The liquid crystal display device according to claim 1, wherein arrangement of the plurality of legs in plan view is identical among all the lenses disposed on a single light emitting diode substrate.

5. The liquid crystal display device according to claim 1, wherein:

each of the plurality of light emitting diode elements comprises an anode and a cathode; and the light emitting diode substrate further comprises an electrode for the anode and an electrode for the cathode, which are formed in a vicinity of the each of the plurality of light emitting diode elements.

6. The liquid crystal display device according to claim 5, wherein:

the electrode for the anode and the electrode for the cathode are formed directly under each of the lenses; and a boundary portion between the electrode for the anode and the electrode for the cathode is provided directly under the each of the lenses.

7. The liquid crystal display device according to claim 1, wherein each of said plurality of legs has a same length.

8. A liquid crystal display device, comprising:

a liquid crystal panel; and a light emitting diode substrate, which is disposed on a rear surface side of the liquid crystal panel and comprises:

a plurality of light emitting diode elements disposed along a longitudinal direction;

a plurality of lenses each including a plurality of legs, each of the lenses being disposed on the liquid crystal panel side of a respective one of the plurality of light emitting diode elements; and a plurality electrodes, formed on a surface of the light emitting diode substrate with a gap between adjacent ones of the electrodes, and having a surface facing the liquid crystal display panel, wherein each of the plurality of light emitting diode elements is electrically connected to two adjacent ones of the plurality of electrodes and extends across the gap between the two adjacent electrodes, wherein each of the plurality of legs for fixing each of the lenses to the light emitting diode substrate is mounted directly to, and completely disposed directly above only one of the adjacent two electrodes to which the light emitting diode element for the lens is connected so that all parts of an image of the leg projected onto the light emitting diode substrate fall on the surface facing the liquid crystal panel of the electrode above which the leg is disposed, and the lenses respectively are fixed directly to the electrodes through intermediate layers which are bonding layers or resist layers formed on the surface of the electrode, and the thicknesses of the intermediate layers are all uniform.

9. The liquid crystal display device according to claim 1, wherein each of the plurality of legs is bonded to the surface of the electrode by a bonding layer contacting an end face of the leg.

10. The liquid crystal display device according to claim 9, wherein the bonding layer is uniform in thickness.

* * * * *